US012767382B2

(12) United States Patent
Mills

(10) Patent No.: US 12,767,382 B2
(45) Date of Patent: Oct. 20, 2026

(54) CONSTRUCT WITH ARTICLE ENGAGEMENT FEATURES

(71) Applicant: Graphic Packaging International, LLC, Atlanta, GA (US)

(72) Inventor: Karen L. Mills, Atlanta, GA (US)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

(21) Appl. No.: 18/748,474

(22) Filed: Jun. 20, 2024

(65) Prior Publication Data

US 2024/0425233 A1 Dec. 26, 2024

Related U.S. Application Data

(60) Provisional application No. 63/522,215, filed on Jun. 21, 2023.

(51) Int. Cl.

| | |
|---|---|
| ***B65D 5/50*** | (2006.01) |
| ***B31B 50/26*** | (2017.01) |
| ***B31B 100/00*** | (2017.01) |
| ***B31B 120/30*** | (2017.01) |
| ***B65D 5/28*** | (2006.01) |

(52) U.S. Cl.

CPC .......... *B65D 5/5021* (2013.01); *B31B 50/262* (2017.08); *B65D 5/28* (2013.01); *B31B 2100/00* (2017.08); *B31B 2120/302* (2017.08)

(58) Field of Classification Search

CPC .. B65D 2571/0066; B65D 2571/00654; B65D 71/40; B65D 71/00; B65D 5/5002; B65D 2571/00123; B65D 2571/00

USPC ......................... 206/427, 429, 147, 148, 153

See application file for complete search history.

(56) References Cited

U.S. PATENT DOCUMENTS 896,642 A 8/1908 Klein
2,298,191 A * 10/1942 Boh .................. B65D 71/0037 206/196

(Continued)

FOREIGN PATENT DOCUMENTS

AU 2019249402 B2 3/2022
AU 2019290523 B2 8/2022

(Continued)

OTHER PUBLICATIONS

International Search Report and Written Opinion for PCT/US2024/034691 dated Sep. 30, 2024.

*Primary Examiner* — Prince Pal

(74) *Attorney, Agent, or Firm* — Andrew N. Claerbout; FisherBroyles, LLP

(57) ABSTRACT

A construct for holding at least one article includes a plurality of panels extending at least partially around an interior of the construct and forming at least one end wall of the construct and a back wall of the construct, a plurality of end flaps foldably connected to a respective panel of the plurality of panels and at least partially overlapped to form a top wall of the construct and a bottom wall of the construct, and attachment features for at least partially engaging one or more portions of the at least one article, the attachment features including at least one article engagement tab extending from a respective end flap of the plurality of end flaps, the at least one article engagement tab for being positioned in a recessed portion of the at least one article.

28 Claims, 6 Drawing Sheets

(56) References Cited

U.S. PATENT DOCUMENTS 2,554,190 A * 5/1951 Hennessey ........... B65D 5/5021 206/568
2,854,183 A * 9/1958 Srofe ..................... B65D 71/40 206/149
2,896,779 A * 7/1959 Armel .................... B65D 71/40 206/499
2,896,780 A 7/1959 Struble
2,896,814 A * 7/1959 Altenburg .......... B65D 71/0003 294/87.2
2,917,877 A * 12/1959 Fisher ................... B65B 11/004 229/117.22
2,931,492 A 4/1960 Osterberg
2,965,410 A * 12/1960 Hughes .................. B65D 71/44 294/87.2
2,982,399 A * 5/1961 Fisher .................... B65D 71/40 229/117.22
3,070,222 A * 12/1962 Jones ..................... B65D 71/16 206/780
3,073,440 A * 1/1963 Jones ................... B65D 5/5021 206/429
3,078,988 A * 2/1963 Dunning ................ B65D 71/40 206/429
3,080,966 A * 3/1963 Kuchenbecker ..... B65D 71/125 206/429
3,083,825 A * 4/1963 Larsen ................... B65D 71/40 206/148
3,094,210 A * 6/1963 Van Den Berg ....... B65D 71/40 294/87.2
3,146,885 A * 9/1964 Hughes .................. B65D 71/20 206/429
3,176,902 A * 4/1965 Champlin .............. B65D 71/36 229/162.1
3,245,579 A * 4/1966 Tolaas .................. B65D 71/285 D9/753
3,260,361 A * 7/1966 Chidsey, Jr. ........... B65D 71/34 206/149
3,724,714 A * 4/1973 Wright ............... B65D 71/0022 206/187
3,854,580 A * 12/1974 Hennessey ............. B65D 71/26 229/120.17
3,881,648 A * 5/1975 Hall ..................... B65D 5/2047 229/164
3,912,157 A * 10/1975 Graser ................... B65D 71/18 229/126
3,999,660 A * 12/1976 Tranquillitsky ....... B65D 71/32 206/141
4,005,644 A * 2/1977 Tranquillitsky ....... B65D 71/32 493/333
4,130,202 A * 12/1978 Champlin .............. B65D 71/18 206/815
4,311,233 A * 1/1982 Austin ................. B65D 5/5206 206/45.21
4,381,057 A * 4/1983 Carver ................... B65D 71/16 229/120.08
4,382,506 A * 5/1983 Chaussadas ........... B65D 71/08 206/428
4,471,870 A * 9/1984 Uhlig ..................... B65D 71/38 206/427
4,606,457 A * 8/1986 Pugh ...................... B65D 71/14 206/427
4,627,536 A * 12/1986 Pugh .................... B65D 5/5002 206/429
4,629,068 A * 12/1986 Pugh ...................... B65D 71/14 206/434
4,629,069 A * 12/1986 Pugh ...................... B65D 71/14 206/429
4,641,746 A * 2/1987 Dornbusch .......... B65D 71/125 229/148
4,662,512 A * 5/1987 Durand ................ B65D 5/5019 229/161
D291,065 S * 7/1987 Pugh .............................. D9/418
4,890,738 A * 1/1990 Carver ................... B65D 71/26 53/462
4,961,501 A * 10/1990 Hansmann ........... B65D 71/125 206/429
5,036,981 A 8/1991 Johansson
5,058,735 A 10/1991 Bienaime
5,156,277 A * 10/1992 Witz ....................... B29C 51/26 206/524.1
5,183,155 A * 2/1993 Vavra ..................... B65D 85/64 206/320
5,328,024 A 7/1994 Sutherland
5,425,446 A * 6/1995 Weaver .................. B65D 71/44 206/427
5,452,799 A 9/1995 Sutherland
5,484,053 A * 1/1996 Harris .................... B65D 71/48 206/149
5,704,649 A 1/1998 Small
5,860,526 A * 1/1999 Burke, Jr. .............. B65D 5/541 206/460
5,944,253 A * 8/1999 Miller .................... B65D 71/36 206/145
6,021,897 A * 2/2000 Sutherland ............. B65D 71/16 206/427
6,213,293 B1 * 4/2001 Marco .................. B65D 71/504 206/161
D498,138 S * 11/2004 Bibi ............................... D9/415
7,019,271 B2 3/2006 Wnek
7,351,942 B2 4/2008 Wnek
7,752,827 B2 7/2010 Learn
7,806,314 B2 * 10/2010 Sutherland ............. B65D 71/36 206/427
7,819,583 B2 10/2010 Walker
7,882,952 B2 2/2011 Learn
7,923,669 B2 4/2011 Wnek
8,002,171 B2 8/2011 Ryan
8,028,839 B2 10/2011 Learn
8,096,413 B2 * 1/2012 Coltri De Paula .... B65D 71/42 206/199
8,127,518 B2 3/2012 Ford
8,230,997 B1 * 7/2012 McWilliams ........ B65D 5/5038 206/139
8,328,079 B2 12/2012 Kohler
8,387,784 B2 3/2013 Gonzalez
8,469,184 B2 6/2013 Spivey, Sr.
8,523,049 B2 9/2013 Fitzwater
8,556,160 B2 * 10/2013 Spivey, Sr. ............ B65D 71/36 206/427
8,563,906 B2 10/2013 Wnek
8,602,212 B2 * 12/2013 Scanzillo ............... B65D 5/002 206/427
8,740,054 B2 6/2014 Pinkstone
8,753,012 B2 6/2014 Files
8,800,855 B2 8/2014 Fitzwater
9,108,761 B2 8/2015 Fitzwater
9,156,579 B2 10/2015 Pinkstone
9,156,582 B2 10/2015 Walsh
9,169,037 B2 10/2015 Pinkstone
9,315,288 B2 4/2016 Pinkstone
9,346,582 B2 5/2016 Pinkstone
9,376,231 B2 6/2016 Pinkstone
9,481,486 B2 11/2016 Nameth
D777,027 S 1/2017 Baker
9,650,184 B2 5/2017 Fily
9,776,750 B2 10/2017 May
9,868,563 B2 1/2018 Pinkstone
10,029,837 B2 * 7/2018 Alexander ............. B65D 71/36
10,086,972 B2 * 10/2018 Hajek .................. B65D 5/0085
10,124,947 B2 11/2018 Pinkstone
10,232,976 B2 3/2019 Waddington
10,287,073 B2 * 5/2019 Zammit ................ B65B 43/265
10,301,090 B2 5/2019 Holley, Jr.
10,343,829 B2 * 7/2019 Zacherle ................ B65D 85/72
10,399,719 B2 * 9/2019 Disrud ................... B65D 71/18
10,414,573 B2 9/2019 Pinkstone
10,472,120 B2 11/2019 Cooper
10,562,687 B2 2/2020 Pinkstone
10,669,061 B2 * 6/2020 Smalley ................... B65D 5/10
11,352,163 B2 6/2022 Haidacher

(56) References Cited

U.S. PATENT DOCUMENTS

| | | | | |
|---|---|---|---|---|
| 11,492,185 | B2 | 11/2022 | Zammit | |
| 11,524,827 | B2 | 12/2022 | Gungner | |
| 11,623,803 | B2 * | 4/2023 | Thompson | B65D 75/04 206/153 |
| 11,713,155 | B2 * | 8/2023 | Royal | B65D 5/48044 206/427 |
| 11,807,432 | B2 | 11/2023 | Weaver | |
| 11,820,569 | B2 * | 11/2023 | Gonzalez Manzano | B65D 71/42 |
| 11,834,235 | B2 | 12/2023 | Pinkstone | |
| 11,873,144 | B2 * | 1/2024 | Centofanti | B65D 5/5069 |
| 11,926,460 | B2 * | 3/2024 | Ritchie | B65D 5/5021 |
| 11,932,467 | B2 * | 3/2024 | Ackroyd | B65D 5/322 |
| 12,054,330 | B2 | 8/2024 | Pinkstone | |
| 12,084,242 | B2 * | 9/2024 | Pinkstone | B65D 5/54 |
| 12,103,751 | B2 | 10/2024 | Hicks | |
| 12,103,753 | B2 | 10/2024 | Mills | |
| D1,075,517 | S * | 5/2025 | Rumsam | D9/418 |
| 12,420,980 | B2 | 9/2025 | Smith | |
| 12,428,194 | B2 * | 9/2025 | Joyce | B65D 5/5021 |
| 2006/0049240 | A1 * | 3/2006 | LeBras | B65D 71/24 229/162.6 |
| 2006/0060739 | A1 * | 3/2006 | Yamashita | A47F 7/283 248/311.2 |
| 2006/0157545 | A1 | 7/2006 | Auclair | |
| 2007/0130811 | A1 | 6/2007 | Shevelev | |
| 2010/0078337 | A1 * | 4/2010 | Sutherland | B65B 21/06 206/148 |
| 2010/0288657 | A1 | 11/2010 | Pinkstone | |
| 2011/0042450 | A1 * | 2/2011 | Mills | B65D 81/07 229/162.6 |
| 2013/0168277 | A1 * | 7/2013 | Monti | B65D 5/48018 229/120.24 |
| 2014/0166519 | A1 * | 6/2014 | Alexander | B65D 81/261 206/427 |
| 2015/0151889 | A1 * | 6/2015 | Kastanek | B65D 81/18 206/427 |
| 2015/0191284 | A1 | 7/2015 | Sutherland | |
| 2015/0239628 | A1 * | 8/2015 | Zammit | B65D 71/20 229/117.14 |
| 2015/0266640 | A1 | 9/2015 | Thompson | |
| 2015/0291329 | A1 * | 10/2015 | Kastanek | B65D 71/46 206/427 |
| 2017/0305630 | A1 | 10/2017 | Miller | |
| 2018/0118402 | A1 * | 5/2018 | Smalley | B65D 5/725 |
| 2019/0210780 | A1 * | 7/2019 | Thompson | B65D 5/241 |
| 2019/0248537 | A1 | 8/2019 | Valencia | |
| 2019/0300255 | A1 * | 10/2019 | Ikeda | B65D 71/20 |
| 2021/0276776 | A1 | 9/2021 | Zammit | |
| 2021/0380319 | A1 * | 12/2021 | Rumsam | B65D 71/125 |
| 2021/0403198 | A1 | 12/2021 | Hajek | |
| 2022/0315275 | A1 * | 10/2022 | Rumsam | B65D 5/443 |
| 2023/0040097 | A1 * | 2/2023 | Stepkowski | B65D 71/18 |
| 2023/0140636 | A1 * | 5/2023 | Autajon | B65D 5/0254 206/526 |
| 2023/0159246 | A1 * | 5/2023 | Chesnet | B65D 71/506 206/147 |
| 2023/0182984 | A1 * | 6/2023 | Fahrner | B65D 71/406 206/427 |
| 2023/0242316 | A1 * | 8/2023 | Ball | B65D 71/30 206/429 |
| 2023/0312161 | A1 | 10/2023 | Smith | |
| 2023/0322435 | A1 | 10/2023 | Brink | |
| 2023/0391524 | A1 * | 12/2023 | Mills | B65D 65/24 |
| 2023/0406589 | A1 * | 12/2023 | Merzeau | B65B 17/025 |
| 2023/0406591 | A1 * | 12/2023 | Van Triel | B65B 27/04 |
| 2024/0034531 | A1 | 2/2024 | Spitler | |
| 2024/0367879 | A1 * | 11/2024 | Ford | B65D 71/40 |
| 2024/0375839 | A1 * | 11/2024 | Boersma | B65D 71/0014 |
| 2024/0391670 | A1 * | 11/2024 | Mills | B65D 71/46 |
| 2024/0425233 | A1 * | 12/2024 | Mills | B31B 50/262 |
| 2025/0002209 | A1 * | 1/2025 | Brink | B65D 5/667 |
| 2025/0019114 | A1 * | 1/2025 | Gungner | B65D 5/2057 |
| 2025/0066090 | A1 * | 2/2025 | Wu | B65D 5/48036 |

FOREIGN PATENT DOCUMENTS

| | | | |
|---|---|---|---|
| AU | 2021276257 | B2 | 10/2024 |
| AU | 2021376196 | B2 | 1/2025 |
| AU | 2021376346 | B2 | 2/2025 |
| CA | 3093778 | C | 1/2023 |
| DE | 8006601 | U1 | 7/1980 |
| EP | 2025608 | | 2/2009 |
| EP | 3070701 | A1 | 9/2016 |
| GB | 2236100 | | 3/1991 |
| GB | 2239861 | A | 7/1991 |
| GB | 2486290 | A | 6/2012 |
| JP | 2003002359 | A | 1/2003 |
| JP | 2007076678 | | 3/2007 |
| JP | 2010208695 | | 9/2010 |
| KR | 20-2015-0002786 | U | 7/2015 |
| WO | 1997018131 | A1 | 5/1997 |
| WO | 2005009857 | A1 | 2/2005 |

* cited by examiner

CONSTRUCT WITH ARTICLE ENGAGEMENT FEATURES

CROSS-REFERENCE TO RELATED APPLICATION

The present application claims the benefit of U.S. Provisional Patent Application No. 63/522,215, filed on Jun. 21, 2023.

INCORPORATION BY REFERENCE

The disclosure of U.S. Provisional Patent Application No. 63/522,215, filed on Jun. 21, 2023, is hereby incorporated by reference for all purposes as if set forth in its entirety.

BACKGROUND OF THE DISCLOSURE

The present disclosure generally relates to constructs for holding one or more articles. In some embodiments, the present disclosure relates to constructs for holding one or more articles and which include article engagement features.

SUMMARY OF THE DISCLOSURE

According to one aspect, the disclosure is generally directed to a construct for holding at least one article, the construct comprising a plurality of panels extending at least partially around an interior of the construct and forming at least one end wall of the construct and a back wall of the construct, a plurality of end flaps foldably connected to a respective panel of the plurality of panels and at least partially overlapped to form a top wall of the construct and a bottom wall of the construct, and attachment features for at least partially engaging one or more portions of the at least one article, the attachment features comprising at least one article engagement tab extending from a respective end flap of the plurality of end flaps, the at least one article engagement tab for being positioned in a recessed portion of the at least one article.

According to another aspect, the disclosure is generally directed to a blank for forming a construct for holding at least one article, the blank comprising a plurality of panels for extending at least partially around an interior of the construct formed from the blank and for forming at least one end wall of the construct and a back wall of the construct formed from the blank, a plurality of end flaps foldably connected to a respective panel of the plurality of panels and for being at least partially overlapped to form a top wall of the construct formed from the blank and a bottom wall of the construct formed from the blank, and attachment features for at least partially engaging one or more portions of the at least one article, the attachment features comprising at least one article engagement tab extending from a respective end flap of the plurality of end flaps, the at least one article engagement tab for being positioned in a recessed portion of the at least one article when the construct is formed from the blank.

According to another aspect, the disclosure is generally directed to a method of forming a construct for holding at least one article, the method comprising obtaining a blank, the blank comprising a plurality of panels, a plurality of end flaps foldably connected to a respective panel of the plurality of panels, and attachment features comprising at least one article engagement tab extending from a respective end flap of the plurality of end flaps. The method further comprises positioning the plurality of panels extending at least partially around an interior of the construct, positioning the plurality of panels to form at least one end wall of the construct and a back wall of the construct, at least partially overlapping the plurality of end flaps to form a top wall of the construct and a bottom wall of the construct, and positioning the attachment features for at least partially engaging one or more portions of the at least one article such that the at least one article engagement tab is for being positioned in a recessed portion of the at least one article.

According to another aspect, the disclosure is generally directed to a package, the package comprising at least one article and a construct holding the at least one article. The construct comprises a plurality of panels extending at least partially around an interior of the construct and forming at least one end wall of the construct and a back wall of the construct, a plurality of end flaps foldably connected to a respective panel of the plurality of panels and at least partially overlapped to form a top wall of the construct and a bottom side of the construct, and attachment features at least partially engaging one or more portions of the at least one article, the attachment features comprising at least one article engagement tab extending from a respective end flap of the plurality of end flaps, the at least one article engagement tab positioned in a recessed portion of the at least one article.

Those skilled in the art will appreciate the above-stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

Constructs according to the present disclosure can accommodate articles of numerous different shapes. For the purpose of illustration and not for the purpose of limiting the scope of the disclosure, the following detailed description describes articles such as articles containing food products. Such food products can be e.g., portioned retail food products that can include one or more of cookies, crackers, cakes, pastries, candies, nuts, popcorn, trail mix, gum, etc. Food products described herein can also include, for example, granulized or powdered food products such as cocoa or hot/cold chocolate mix, teas, seasonings such as salt, pepper, herbs, spices, etc., drink mix or flavoring, dehydrated food particles (e.g., soups or mashes), powdered baby food items, etc. The articles can include an outer or otherwise associated packaging that can be made from materials suitable in composition for packaging the particular food or beverage item, and the materials include, but are not limited to, glass; aluminum and/or other metals; plastics such as PET, LDPE, LLDPE, HDPE, PP, PS, PVC, EVOH, and Nylon; composite materials; and the like, or any combination thereof.

The articles described herein can include different types of food or beverage products, packaging thereof, and/or having different shapes, without departing from the disclosure. In this specification, the terms "lower," "bottom," "upper," and "top" indicate orientations determined in relation to fully erected and upright constructs. As described herein, constructs can be formed from blanks by overlapping multiple panels, portions, and/or end flaps. Such panels, portions and/or end flaps may be designated herein in terms relative to one another, e.g., "first", "second", "third", etc., in sequential or non-sequential reference, without departing from the disclosure.

Figure 3:
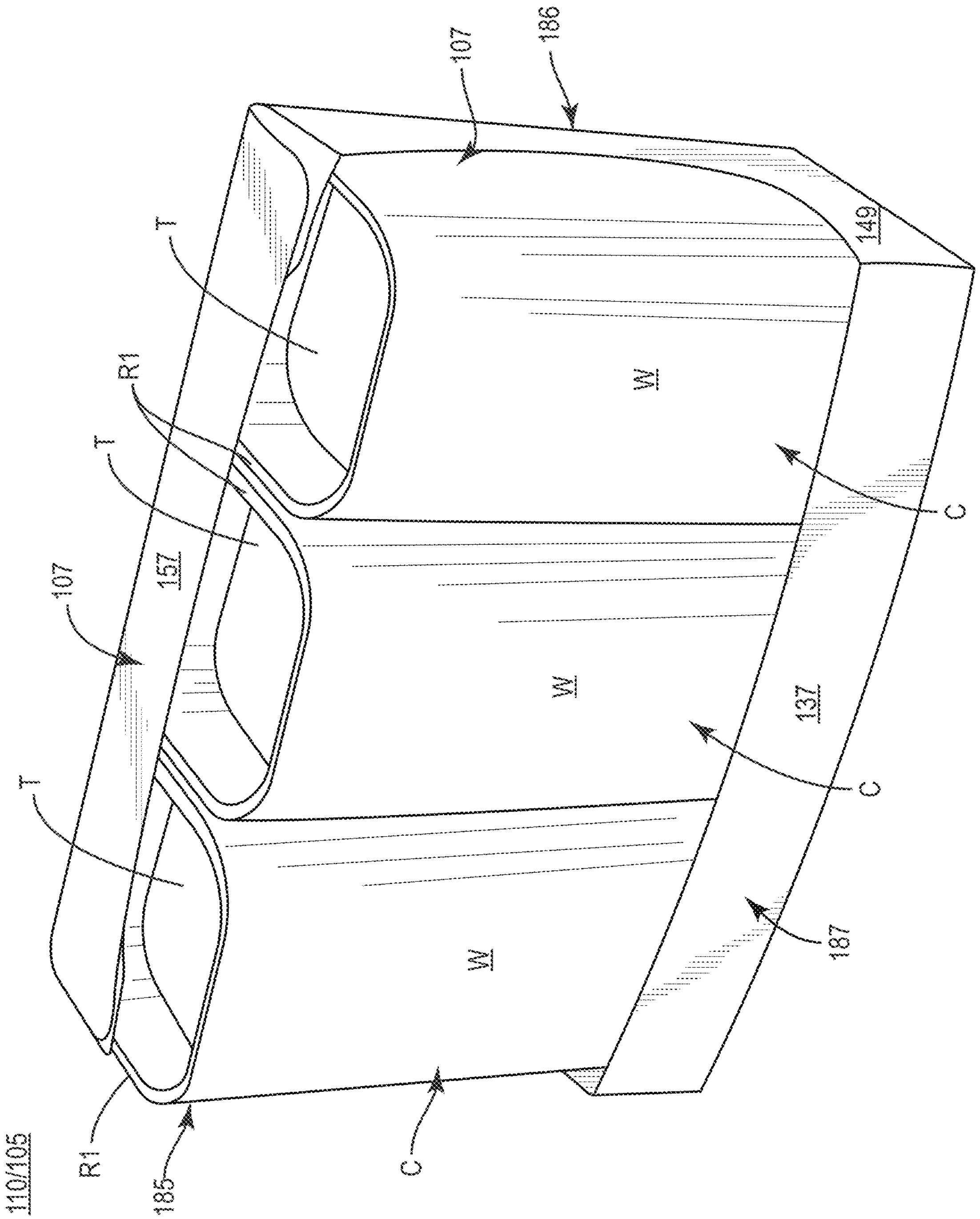
FIG. 3 is a perspective view of a construct and package formed from the blank of FIG. 1 according to the first exemplary embodiment of the disclosure.
Figure 4:
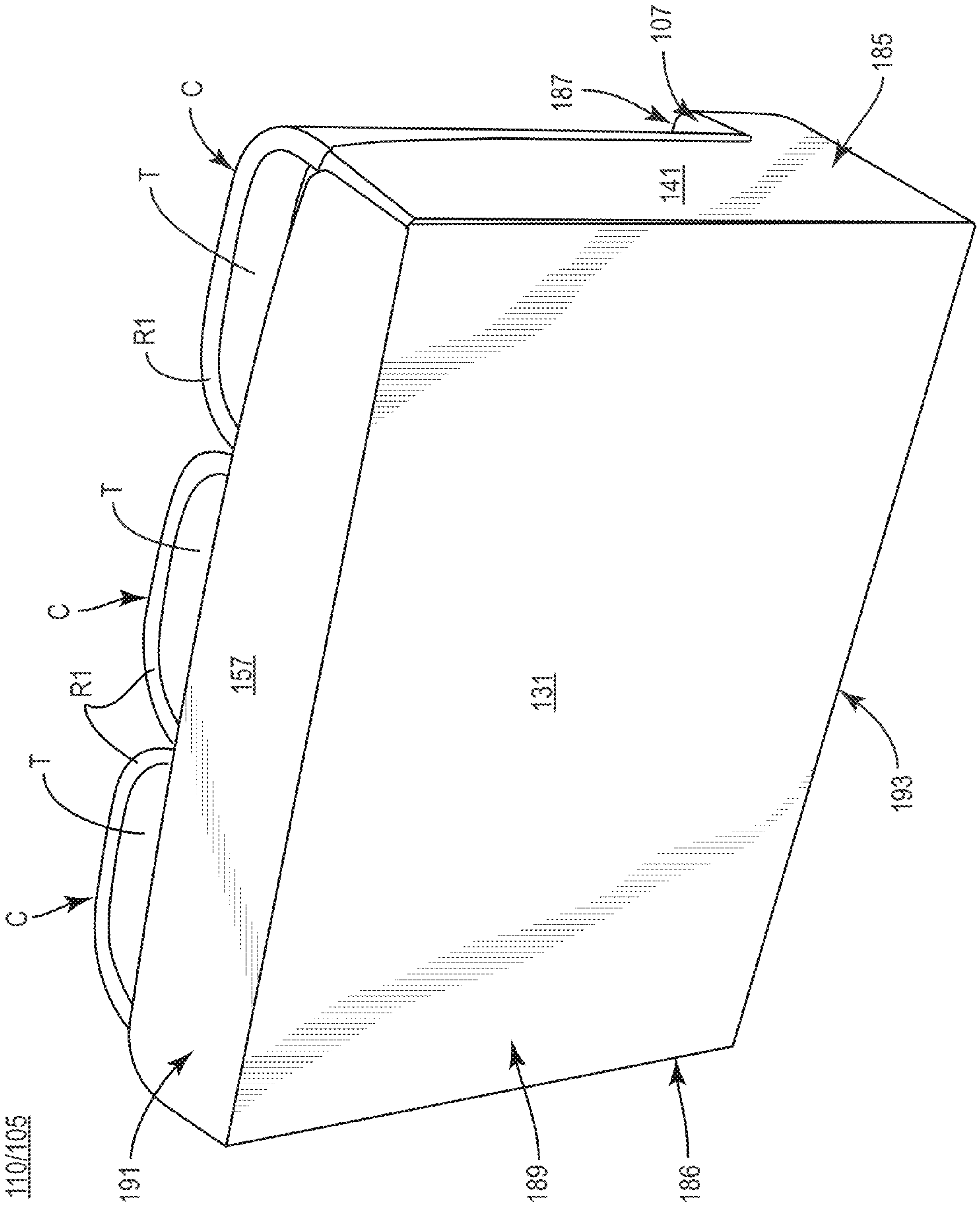
FIG. 4 is another perspective view of the construct and package of FIG. 53
Figure 6:
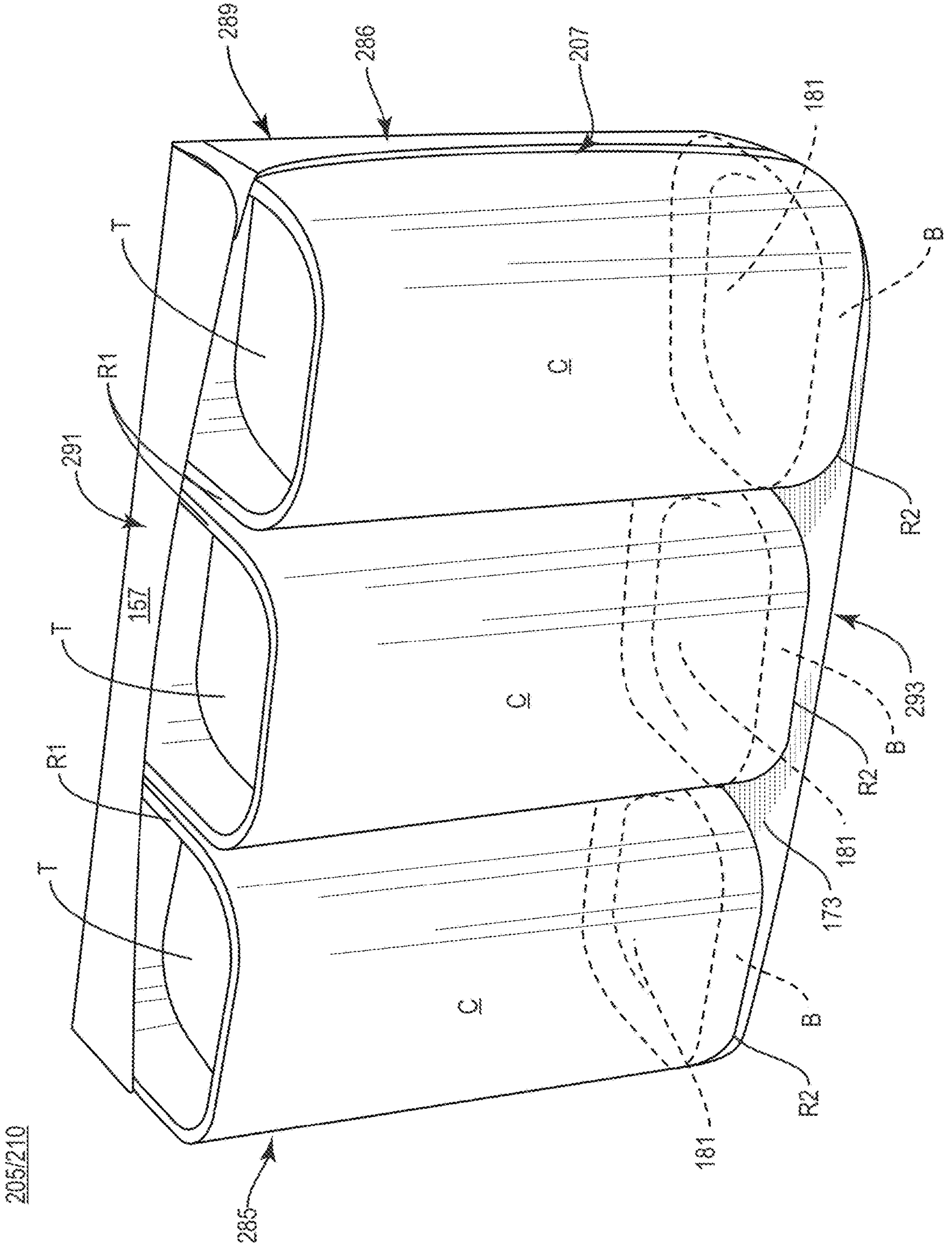
FIG. 6 is a perspective view of a construct and package formed from the blank of FIG. 5 according to the second exemplary embodiment of the disclosure.

Referring momentarily to FIG. 3, example articles C that are suitable for use with the present disclosure can include at least one sidewall W, a recessed top portion T (broadly, "a recessed portion of the article" at least partially defined by an upper rim R1, and a recessed bottom portion B (FIG. 6) (broadly, "another recessed portion of the article") at least partially defined by a lower rim R2 (FIG. 6). In some embodiments, the recessed bottom portion and lower rim can have a configuration generally similar to that of the respective recessed top portion and upper rim.

It will be understood that the sidewall W, top portion T, and bottom portion of the articles C can be formed by panels and flaps/end flaps, in overlapping or single arrangements. In some embodiments, the top portion T can be at least partially separable from the at least one sidewall W or a portion thereof to access an interior of the article for holding one or more food or beverage products as described above. In some embodiments, the articles C can be a composite-based container such as a Boardio® composite can available from Graphic Packaging International, LLC of Atlanta, GA.

Figure 1:
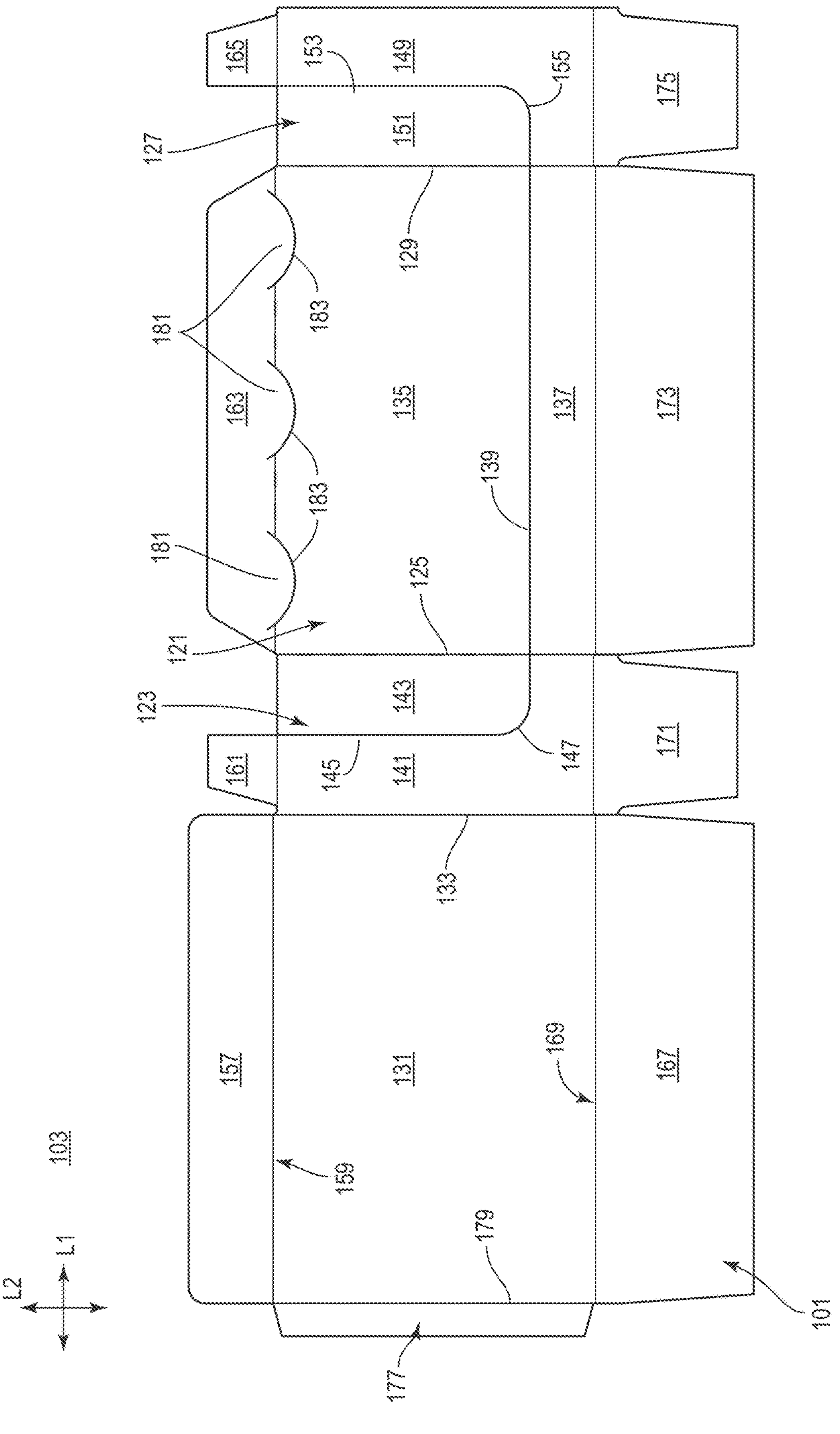
FIG. 1 is a plan view of an exterior surface of a blank used to form a construct and package according to a first exemplary embodiment of the disclosure.
Figure 2:
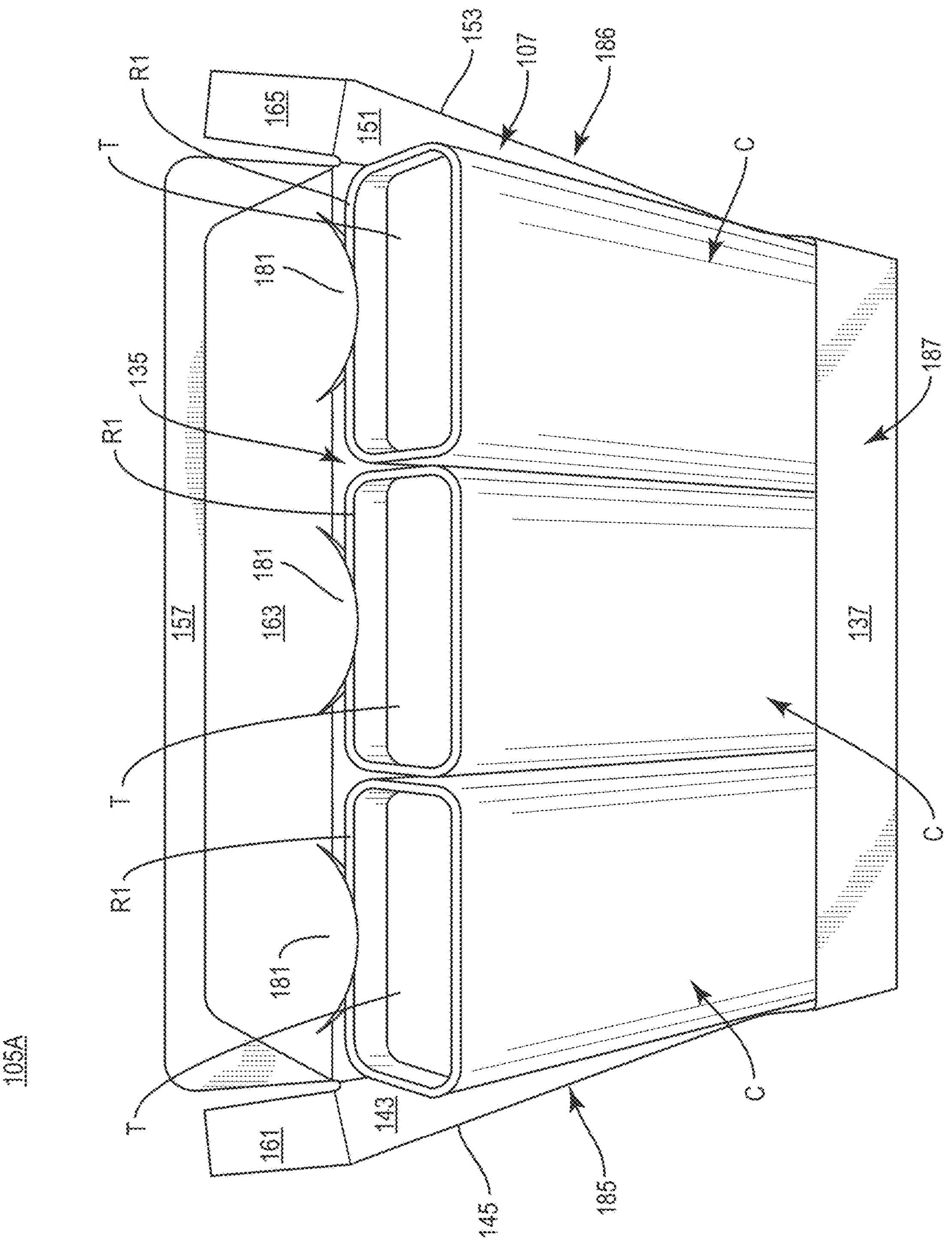
FIG. 2 is a perspective view of a construct and package partially formed from the blank of FIG. 1 according to the first exemplary embodiment of the disclosure.

FIG. 1 is a plan view of an exterior surface 101 of a blank, generally indicated at 103, used to form a carton or construct 105 (FIG. 2) according to a first exemplary embodiment of the disclosure. As described further herein, the blank 103 can include article engagement features for forming article engagement features of the construct 105 that are for engaging a portion of one or more articles C. In some embodiments, the article engaging features of the blank 103/construct 105 are for at least partially locking or securing the article(s) C to the construct 105. The construct 105 can be provided with one or more articles C to form a package 110 (FIG. 2).

As shown, the blank 103 has a longitudinal axis L1 and a lateral axis L2 and includes a plurality of panels for extending at least partially around an interior 107 of the construct 105 when the construct 105 is formed from the blank 103. The panels can include a first side panel 121, a second side panel 123 foldably connected to the first side panel 121 at a lateral fold line 125, a third side panel 127 (broadly, "fourth side panel") foldably connected to the first side panel 121 at a lateral fold line 129, and a fourth side panel 131 (broadly, "third side panel") foldably connected to the second side panel 123 at a lateral fold line 133. It will be understood that each side panel 121, 123, 127, 131 can be considered a side panel of the blank 103 and construct 105 formed therefrom, and that respective panels could be considered a front panel, back panel, or end panel depending upon the orientation of the formed construct 105.

The first side panel 121, as shown, can include a back portion 135 and a front portion 137 at least partially separable from the back portion 135 at a generally longitudinal cut 139.

The second side panel 123 can include a first side portion 141 foldably connected to a second side portion 143 at a generally lateral fold line 145 that intersects a generally J-shaped cut 147 at which the first side portion 141 is at least partially separable from the second side portion 143.

Similarly, the third side panel 127 can include a first side portion 149 foldably connected to a second side portion 151 at a generally lateral fold line 153 that intersects a generally J-shaped cut 155 at which the first side portion 149 is at least partially separable from the second side portion 151.

As also shown, the cuts 147, 155 can intersect respective endpoints of the cut 139. In some embodiments, the cuts 139, 147, 155 can be segments of a generally continuous cut.

The blank 103 and construct 105 formed therefrom can also include a plurality of end flaps foldably connected to a respective panel of the plurality of panels. The plurality of end flaps can include a top end flap 157 foldably connected to a respective portion of the fourth side panel 131 at a respective portion of a longitudinal fold line 159, a top end flap 161 foldably connected to the second side panel 123 at a respective portion of the fold line 159, a top end flap 163 foldably connected to the first side panel 121 at a respective portion of the fold line 159, and a top end flap 165 foldably connected to the third side panel 127 at a respective portion of the fold line 159. It will be understood that the aforementioned segments of the fold line 159, in some embodiments, can be distinct fold lines.

The plurality of end flaps can also include a bottom end flap 167 foldably connected to a respective portion of the fourth side panel 131 at a respective portion of a longitudinal fold line 169, a bottom end flap 171 foldably connected to the second side panel 123 at a respective portion of the fold line 169, a bottom end flap 173 foldably connected to the first side panel 121 at a respective portion of the fold line 169, and a bottom end flap 175 foldably connected to the third side panel 123 at a respective portion of the fold line 169. It will be understood that the aforementioned segments of the fold line 169, in some embodiments, can be distinct fold lines.

An attachment end flap 177, as shown, can be foldably connected to the fourth side panel 131 at a lateral fold line 179. In some embodiments, the attachment end flap 177 can be considered an end flap of the plurality of end flaps of the blank 103 and construct 105 formed therefrom, and in other embodiments, the flap 177 can be considered a panel of the plurality of panels of the blank 103 and construct 105 formed therefrom.

In the illustrated embodiment, article engagement features of the blank 103/construct 105 can include a plurality of article engagement tabs 181 (broadly, "first at least one article engagement tabs") at least partially defined by respective curved cuts 183 that interrupt a respective portion of the fold line 159. In some embodiments, one or more of the cuts 183 can extend from the panel 121 past the fold line 159 and at least partially into the end flap 163. As described further herein, upon formation of the construct 105 from the blank 103, the article engagement tabs 181 can at least partially separate from the first side panel 121 so as to extend away from the end flap 163. In this regard, the article engagement tabs 181 can be considered to be at least partially defined in one or both of the first side panel 121 and the end flap 163.

As described further herein, the article engagement tabs 181 are configured to at least partially engage one or more articles C when the construct 105 is formed from the blank 103. In some embodiments, the article engagement tabs 181 are configured for being at least partially received/positioned in the recessed top portion T of the one or more articles C. In some embodiments, and as described further herein, the article engagement tabs 181 can be configured for being at least partially received/positioned in the recessed bottom portion of the one or more articles C.

With additional reference to FIGS. 2 and 3, formation of the construct 105 and package 110 from the blank 103 according to an exemplary embodiment of the disclosure will be described.

According to some embodiments, the blank 103 can be inverted, e.g., such that the exterior surface 101 is positioned in a supporting surface and such that an interior surface thereof opposite the exterior surface is positioned facing upwardly.

The plurality of end flaps 157, 161, 163, 165 can be folded at respective portions of the fold line 159 into at least partial face-to-face contact with the respective panels 131, 123, 121, 127, and the plurality of end flaps 167, 171, 173, 175 can be folded at respective portions of the fold line 169 into at least partial face-to-face contact with respective panels 131, 123, 121, 127.

Simultaneously or thereafter, the fourth side panel 131 can be folded at the fold line 133 into at least partial face-to-face contact with respective portions of the second side panel 123 and the first side panel 121. Such movement of the fourth side panel 131 can carry the end flap 157 into at least partial face-to-face contact with respective portions of the end flaps 161, 163, and can carry the end flap 167 into at least partial face-to-face contact with respective portions of the end flaps 171, 173. The attachment end flap 177 can also be carried into at least partial face-to-face contact with a respective portion of the first side panel 121.

The third side panel 127 can be folded at the fold line 129 into at least partial face-to-face contact with respective portions of the first side panel 121, the fourth side panel 131, and the attachment end flap 177.

The panels 121, 123, 127, 131 can then be positioned extending at least partially around the interior 107 of the construct 105, for example, via relative folding at the fold lines 125, 129, 133. The attachment end flap 177 can be at least partially folded at the fold line 179 into at least partial face-to-face contact with the third side panel 127. In such an arrangement, at least portions of the panels 121, 131 can be positioned in generally spaced and parallel arrangement, and at least portions of the panels 123, 127 can be positioned in generally spaced and parallel arrangement, with at least portions of the panels 123, 127 extending perpendicularly from at least portions of the panel 121 to at least portions of the panel 131.

Further to the aforementioned movement of the panels 121, 123, 127, 131, erection of the construct 105 from the blank 103 can include the at least partial separation of the back portion 135 from the front portion 137 of the first side panel 121 at the cut 139, the at least partial separation of the side portion 143 from the side portion 141 of the second side panel 123 at the cut 147, and the at least partial separation of the side portion 151 from the side portion 149 of the third side panel 127 at the cut 155.

Such at least partial separation of the portions 135, 143, 151 described above can also include the maintenance of the back portion 135 of the first side panel 121 in at least partial face-to-face contact with a respective portion of the fourth side panel 131, the at least partial folding of the side portion 143 into at least partial face-to-face contact with the side portion 141 of the second side panel 123 at the fold line 145, and the at least partial folding of the side portion 151 into at least partial face-to-face contact with the side portion 149 of the third side panel 127 at the fold line 153.

The end flaps 167, 171, 173, 175 can be folded at respective portions of the fold line 169 into generally perpendicular arrangement with the panels 131, 123, 121, 127, with one of the end flaps 167, 173 positioned in at least partial face-to-face contact with respective portions of the end flaps 171, 175, and the other of the end flaps 167, 173 positioned in at least partial face-to-face contact with the respective end flap 167, 173.

Similarly, the end flaps 157, 161, 163, 165 can be folded at respective portions of the fold line 159 into generally perpendicular arrangement with the panels 131, 123, 121, 127, with the end flap 163 positioned in at least partial face-to-face contact with respective portions of the end flaps 161, 165, and with the end flap 157 positioned in at least partial face-to-face contact with respective portions of the end flaps 161, 163, 165.

It will be understood that one or more of the articles C can be positioned in the interior 107 of the construct 105 prior to overlapping one or both of the plurality of end flaps 167, 171, 173, 175 and the plurality of end flaps 157, 161, 163, 165 as described above, and/or could be positioned in at least partial face-to-face contact with one or more of the panels 121, 123, 127, 131 as a step intermediate to that of the aforementioned folding of the panels 121, 123, 127, 131 described above to form the package 110.

The folding of the end flap 163 at the respective portions of the fold line 159 can cause the article engagement tabs 181 to at least partially separate from the back portion 135 of the first side panel 121 at the respective cuts 183, thereby positioning the article engagement tabs 181 to at least partially extend into the recessed top portions T of the respective articles C.

The arrangement of the activated article engagement tabs 181 can be such that one or more free edges of the article engagement tabs 181 are positioned in engagement with an interior surface, e.g., a surface thereof facing and/or positioned in the recessed top portion T, of the upper rim R1 of the respective article C, e.g., so as to maintain a bracing engagement of the of the article engagement tab 181 with the respective article C. In some embodiments, a free edge of the end flap 163 can be positioned in engagement with an interior surface of the upper rim R1 of the respective article C.

The construct 105/package 110 is thus formed from the blank 103 so as to have a first end wall 185 (broadly, “first end wall” or “second end wall”) at least partially formed by the side portions 141, 143 of the second side panel 121 in at least partial face-to-face contact, a second end wall 186 (broadly, “first end wall” or “second end wall”) at least partially formed by the side portions 149, 151 of the third side panel 121 in at least partial face-to-face contact, a front wall 187 at least partially formed by the front portion 137 of the first side panel 121 spaced apart from the back portion 135 of the first side panel 121, a back wall 189 at least partially formed by the back portion 135 of the first side panel 121 in at least partial face-to-face contact with the fourth side panel 131, a top wall 191 (broadly, "top end") at least partially formed by the overlapped end flaps 157, 161, 163, 165, and a bottom wall 193 (broadly, "bottom end") at least partially formed by the overlapped end flaps 167, 171, 173, 175.

Furthermore, the foregoing construct 105/package 110 formed from the blank 103 provides a secure packaging that is configured to at least partially attach/lock to the unique configuration of one or more articles C, e.g., a recessed end portion thereof.

Figure 5:
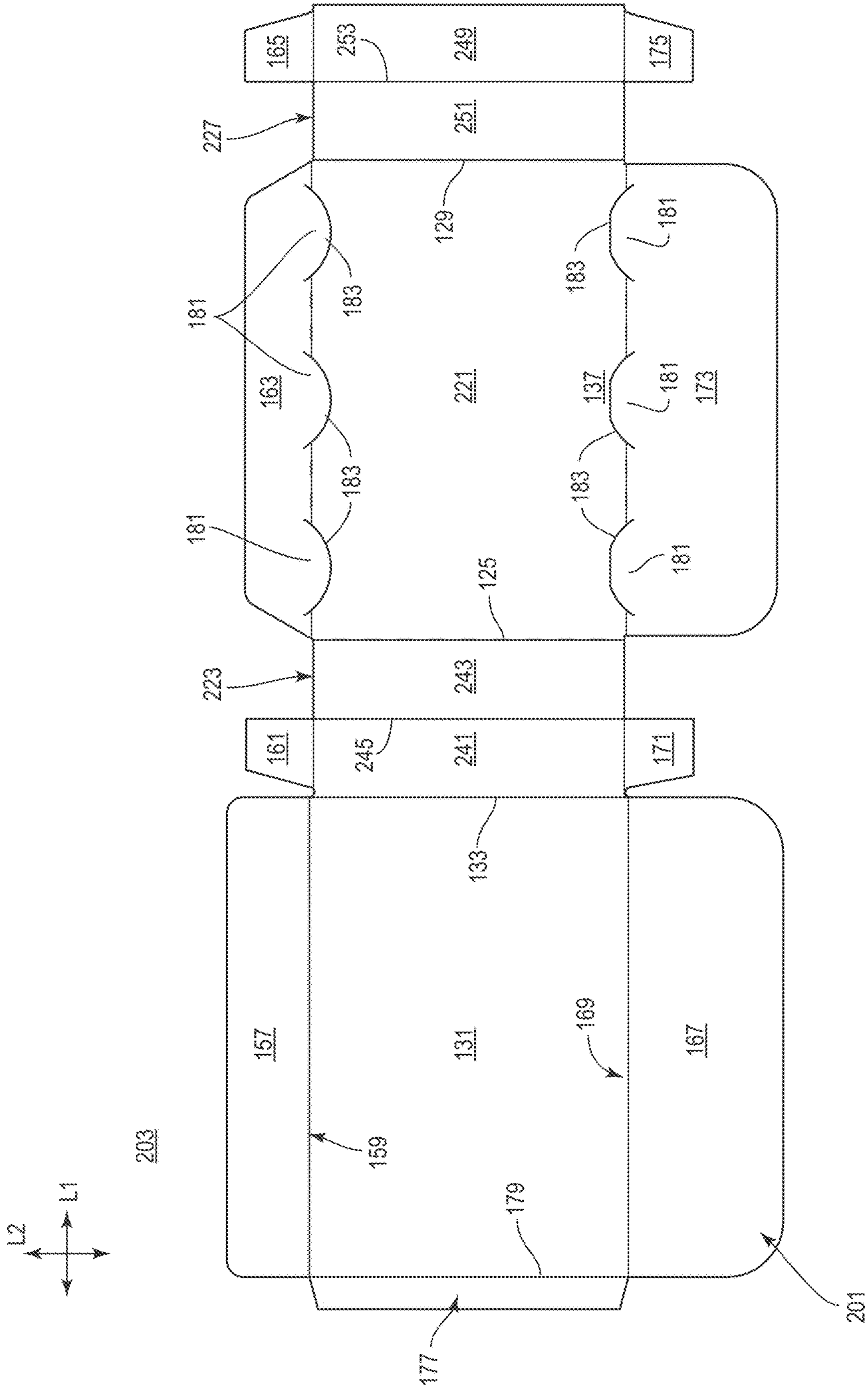
FIG. 5 is a plan view of an exterior surface of a blank used to form a construct and package according to a second exemplary embodiment of the disclosure.

Turning to FIG. 5, a plan view of an exterior surface 201 of a blank 203 for forming a construct 205 (FIG. 8) according to a second exemplary embodiment of the disclosure is illustrated. The blank 203 and construct 205 formed therefrom can have one or more features that are the same or similar to those described above with respect to the blank 103 and construct 105, and like or similar features are designated with like or similar reference numerals. The construct 205 formed from the blank 203 can be provided with one or more articles C as a package 210 (FIG. 8).

As shown, the blank 203 can be generally similar to the blank 103 described above, though the second side panel 223 is provided with a first side portion 241 foldably connected to a second side portion 243 at a lateral fold line 245. Similarly, the third side panel 227 (broadly, "fourth side panel") of the blank 203 and construct 205 formed therefrom includes a first side portion 249 foldably connected to a second side portion 251 at a lateral fold line 253. Furthermore, the first side panel 221 of the blank 203 and construct 205 formed therefrom can be devoid of a front portion, as shown.

As shown, the article engagement features of the blank 203 and construct 205 formed therefrom can include a further plurality of article engagement tabs 181 (broadly, "second at least one article engagement tab") at least partially formed by cuts 183 that interrupt the respective portion of the fold line 169 so as to protrude away from the end flap 173. In some embodiments, one or more of the cuts 183 can extend from the panel 221 past the fold line 169 and at least partially into the end flap 173.

As described further herein, upon formation of the construct 205 from the blank 203, the article engagement tabs 181 can at least partially separate from the first side panel 221 so as to extend away from the end flap 173. In this regard, the article engagement tabs 181 can be considered to be at least partially defined in one or both of the first side panel 221 and the end flap 173.

Accordingly, with additional reference to FIG. 8, the construct 205 and package 210 can be formed from the blank 203 in a manner generally similar to that described above with respect to the formation of the construct 105 and package 110 from the blank 103, and such that the construct 205 at least partially defines an interior 207 to hold three articles C, though it will be understood that the construct 205 can hold a different number of containers without departing from the disclosure.

The aforementioned formation of the construct 205 from the blank 103 can include the folding of the side portion 243 of the panel 223 into at least partial face-to-face contact with the side portion 241 thereof at the fold line 245, the folding of the side portion 251 of the panel 227 into at least partial face-to-face contact with the side portion 249 thereof at the fold line 253, and the positioning of the panel 221 into at least partial face-to-face contact with the panel 131 without and relative separation of portions thereof at associated cuts.

Accordingly, the construct 205/package 210 is thus formed from the blank 203 so as to have a first end wall 285 (broadly, "first end wall" or "second end wall") at least partially formed by the side portions 241, 243 of the second side panel 221 in at least partial face-to-face contact, a second end wall 286 (broadly, "first end wall" or "second end wall") at least partially formed by the side portions 249, 251 of the first side panel 221 in at least partial face-to-face contact, a back wall 289 at least partially formed by first side panel 221 in at least partial face-to-face contact with the fourth side panel 131, a top wall 291 (broadly, "top end") at least partially formed by the overlapped end flaps 157, 161, 163, 165, and a bottom wall 293 (broadly, "bottom end") at least partially formed by the overlapped end flaps 167, 171, 173, 175. In this regard, the construct 205/package 210 can be formed without a front wall, though it will be understood that a front wall or front covering structure could be provided without departing from the disclosure.

Furthermore, the aforementioned formation of the construct 205/package 210 can include folding of the end flap 173 at the respective portions of the fold line 169 to cause the article engagement tabs 181 associated therewith to at least partially separate from the first side panel 221 at the respective cuts 183, thereby positioning the article engagement tabs 181 to at least partially extend into the recessed bottom portions of the respective articles C. Such arrangement of the activated article engagement tabs 181 associated with the end flap 173 can be such that one or more free edges of the article engagement tabs 181 are positioned in engagement with an interior surface of the lower rim R2 of the respective article C, e.g., so as to maintain a bracing engagement of the of the article engagement tab 181 with the respective article C in a manner similar to that described above with respect to the engagement of the article engagement tabs 181 with the respective upper rim R1.

Accordingly, the blank 203/construct 205/package 210 provides advantages similar to those described above to those with respect to the blank 103/construct 105/package 110, with the addition of the provision of the structure and associated article engagement capabilities of the article engagement tabs 181 associated with the end flap 173.

It will be understood that one or more portions of one or more of the blanks and constructs/packages formed therefrom can have a different configuration without departing from the disclosure.

The blanks according to the present disclosure can be, for example, formed from coated paperboard and similar materials. For example, the interior and/or exterior sides of the blanks can be coated with a clay coating. The clay coating may then be printed over with product, advertising, price coding, and other information or images. The blanks may then be coated with a varnish to protect any information printed on the blank. The blanks may also be coated with, for example, a moisture barrier layer, on either or both sides of the blanks. In accordance with the above-described embodiments, the blank may be constructed of paperboard of a caliper such that it is heavier and more rigid than ordinary paper. The blanks can also be constructed of other materials, such as cardboard, hard paper, or any other material having properties suitable for enabling the trays, to function at least generally as described above. The blanks can also be laminated to or coated with one or more sheet-like materials at selected panels or panel sections.

In accordance with the above-described embodiments of the present disclosure, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed portion in the material along the desired line of weakness; a cut that extends partially into a material along the desired line of weakness, and/or a series of cuts that extend partially into and/or completely through the material along the desired line of weakness; and various combinations of these features.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the spaced apart slits to be replaced with a continuous slit, a continuous score, or the like. For example, a cut line can be a continuous slit or could be wider than a slit without departing from the present disclosure. Also, a tear line can be a series of cut scores passing completely, or partially, through the material, that are separated by nicks.

The term "glue" is intended to encompass all manner of adhesives commonly used to secure tray panels in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A construct for holding at least one article, the construct comprising:

a plurality of panels extending at least partially around an interior of the construct and forming at least one end wall of the construct and a back wall of the construct;

a plurality of end flaps foldably connected to a respective panel of the plurality of panels and at least partially overlapped to form a top wall of the construct and a bottom wall of the construct; and attachment features for at least partially engaging one or more portions of the at least one article, the attachment features comprising at least one article engagement tab extending from a respective end flap of the plurality of end flaps, the at least one article engagement tab for being positioned in a recessed portion of the at least one article, the respective end flap of the plurality of end flaps is foldably connected to a respective panel of the plurality of panels at a fold line, the at least one article engagement tab at least partially defined by a cut interrupting the fold line, the respective panel of the plurality of panels is a first side panel, the plurality of panels further comprises a second side panel foldably connected to the first side panel, and the plurality of panels further comprises a third side panel foldably connected to the second side panel, the first side panel is in at least partial face-to-face contact with the third side panel and the back wall of the construct is at least partially formed by the third side panel overlapping at least a portion of the first side panel, the at least one end wall of the construct is at least partially formed by the second side panel, the second side panel comprising a first portion at least partially foldably connected to a second portion, first portion of the second side panel is folded into at least partial face-to-face contact with the second portion of the second side panel.

2. The construct of claim 1, wherein the cut is a curved cut.

3. The construct of claim 2, wherein the cut extends from the respective panel of the plurality of panels at least partially into the respective end flap of the plurality of end flaps.

4. The construct of claim 1, wherein the at least one end wall of the construct is a first end wall of the construct, the construct further comprises a second end wall, the plurality of panels further comprises a fourth side panel foldably connected to the first side panel, the fourth side panel comprising a first portion at least partially foldably connected to a second portion, the first portion of the fourth side panel folded into at least partial face-to-face contact with the second portion thereof to at least partially form the second end wall of the construct.

5. The construct of claim 4, wherein the construct further comprises a front wall, the first side panel comprises a back portion at least partially separated from a front portion, the back portion in at least partial face-to-face contact with the fourth side panel to at least partially form the back wall of the construct, the front portion spaced away from the back portion to at least partially form the front wall of the construct.

6. The construct of claim 1, wherein the respective end flap of the plurality of end flaps is a top end flap foldably connected to the first side panel, the plurality of end flaps further comprises a bottom end flap foldably connected to the first side panel, the at least one article engagement tab is a first at least one article engagement tab extending from the top end flap for being positioned in the recessed portion of the at least one article, and the article engagement features further comprise a second at least one article engagement tab extending from the bottom end flap for being positioned in another recessed portion of the at least one article.

7. The construct of claim 6, wherein the bottom end flap is foldably connected to the first side panel at a fold line, the second at least one article engagement tab at least partially defined by a curved cut interrupting the fold line foldably connecting the bottom end flap to the first side panel.

8. A blank for forming a construct for holding at least one article, the blank comprising:

a plurality of panels for extending at least partially around an interior of the construct formed from the blank and for forming at least one end wall of the construct and a back wall of the construct formed from the blank;

a plurality of end flaps foldably connected to a respective panel of the plurality of panels and for being at least partially overlapped to form a top wall of the construct formed from the blank and a bottom wall of the construct formed from the blank; and attachment features for at least partially engaging one or more portions of the at least one article, the attachment features comprising at least one article engagement tab extending from a respective end flap of the plurality of end flaps, the at least one article engagement tab for being positioned in a recessed portion of the at least one article when the construct is formed from the blank, the respective end flap of the plurality of end flaps is foldably connected to a respective panel of the plurality of panels at a fold line, the at least one article engagement tab at least partially defined by a cut interrupting the fold line, the respective panel of the plurality of panels is a first side panel, the plurality of panels further comprises a second side panel foldably connected to the first side panel, and the plurality of panels further comprises a third side panel foldably connected to the second side panel, the first side panel is for being positioned in at least partial face-to-face contact with the third side panel when the construct is formed from the blank and the third side panel overlaps at least a portion of the first side panel for at least partially forming the back wall of the construct formed from the blank, the second side panel comprises a first portion at least partially foldably connected to a second portion, the second side panel for at least partially forming the at least one end wall of the construct formed from the blank, the first portion of the second side panel is for being folded into at least partial face-to-face contact with the second portion of the second side panel when the construct is formed from the blank.

9. The blank of claim 8, wherein the cut is a curved cut.

10. The blank of claim 9, wherein the cut extends from the respective panel of the plurality of panels at least partially into the respective end flap of the plurality of end flaps.

11. The blank of claim 8, wherein the at least one end wall of the construct formed from the blank is a first end wall of the construct formed from the blank, the plurality of panels further comprises a fourth side panel foldably connected to the first side panel, the fourth side panel comprising a first portion at least partially foldably connected to a second portion, the first portion of the fourth side panel for being folded into at least partial face-to-face contact with the second portion thereof to at least partially form a second end wall of the construct formed from the blank.

12. The blank of claim 11, wherein the first side panel comprises a back portion at least partially separably connected to a front portion, the back portion for being positioned in at least partial face-to-face contact with the fourth side panel to at least partially form a back wall of the construct formed from the blank, the front portion for being positioned spaced away from the back portion to at least partially form a front wall of the construct formed from the blank.

13. The blank of claim 8, wherein the respective end flap of the plurality of end flaps is a top end flap foldably connected to the first side panel, the plurality of end flaps further comprises a bottom end flap foldably connected to the first side panel, the at least one article engagement tab is a first at least one article engagement tab extending from the top end flap for being positioned in the recessed portion of the at least one article when the construct is formed from the blank, and the article engagement features further comprise a second at least one article engagement tab extending from the bottom end flap for being positioned in another recessed portion of the at least one article when the construct is formed from the blank.

14. The blank of claim 13, wherein the bottom end flap is foldably connected to the first side panel at a fold line, the second at least one article engagement tab at least partially defined by a curved cut interrupting the fold line foldably connecting the bottom end flap to the first side panel.

15. A method of forming a construct for holding at least one article, the method comprising:

obtaining a blank, the blank comprising a plurality of panels, a plurality of end flaps foldably connected to a respective panel of the plurality of panels, and attachment features comprising at least one article engagement tab extending from a respective end flap of the plurality of end flaps;

positioning the plurality of panels extending at least partially around an interior of the construct;

positioning the plurality of panels to form at least one end wall of the construct and a back wall of the construct;

at least partially overlapping the plurality of end flaps to form a top wall of the construct and a bottom wall of the construct;

positioning the attachment features for at least partially engaging one or more portions of the at least one article such that the at least one article engagement tab is for being positioned in a recessed portion of the at least one article, the respective end flap of the plurality of end flaps is foldably connected to a respective panel of the plurality of panels at a fold line, the at least one article engagement tab at least partially defined by a cut interrupting the fold line, the respective panel of the plurality of panels is a first side panel, the plurality of panels further comprises a second side panel foldably connected to the first side panel, and the plurality of panels further comprises a third side panel foldably connected to the second side panel; and, positioning the first side panel in at least partial face-to-face contact with the third side panel and positioning the third side panel to overlap at least a portion of the first side panel to at least partially form the back wall of the construct, the second side panel comprising a first portion at least partially foldably connected to a second portion, and the method comprises positioning the second side panel to at least partially form the at least one end wall of the construct, and the method comprising folding the first portion of the second side panel into at least partial face-to-face contact with the second portion of the second side panel.

16. The method of claim 15, wherein the cut is a curved cut.

17. The method of claim 16, wherein the cut extends from the respective panel of the plurality of panels at least partially into the respective end flap of the plurality of end flaps.

18. The method of claim 15, wherein the at least one end wall of the construct is a first end wall of the construct, the plurality of panels further comprises a fourth side panel foldably connected to the first side panel, the fourth side panel comprising a first portion at least partially foldably connected to a second portion, and the method comprises folding the first portion of the fourth side panel into at least partial face-to-face contact with the second portion thereof to at least partially form a second end wall of the construct.

19. The method of claim 18, wherein the first side panel comprises a back portion at least partially separable from a front portion, the method comprises at least partially separating the back portion from the front portion and positioning the back portion in at least partial face-to-face contact with the fourth side panel to at least partially form the back wall of the construct, and the method comprises positioning the front portion spaced away from the back portion to at least partially form a front wall of the construct.

20. The method of claim 15, wherein the respective end flap of the plurality of end flaps is a top end flap foldably connected to the first side panel, the plurality of end flaps further comprises a bottom end flap foldably connected to the first side panel, the at least one article engagement tab is a first at least one article engagement tab extending from the top end flap for being positioned in the recessed portion of the at least one article, and the article engagement features further comprise a second at least one article engagement tab extending from the bottom end flap for being positioned in another recessed portion of the at least one article.

21. The method of claim 20, wherein the bottom end flap is foldably connected to the first side panel at a fold line, the second at least one article engagement tab at least partially defined by a curved cut interrupting the fold line foldably connecting the bottom end flap to the first side panel.

22. A package, comprising:

at least one article; and a construct holding the at least one article, the construct comprising:

a plurality of panels extending at least partially around an interior of the construct and forming at least one end wall of the construct and a back wall of the construct;

a plurality of end flaps foldably connected to a respective panel of the plurality of panels and at least partially overlapped to form a top wall of the construct and a bottom side of the construct; and attachment features at least partially engaging one or more portions of the at least one article, the attachment features comprising at least one article engagement tab extending from a respective end flap of the plurality of end flaps, the at least one article engagement tab positioned in a recessed portion of the at least one article, the respective end flap of the plurality of end flaps is foldably connected to a respective panel of the plurality of panels at a fold line, the at least one article engagement tab at least partially defined by a cut interrupting the fold line, the respective panel of the plurality of panels is a first side panel, the plurality of panels further comprises a second side panel foldably connected to the first side panel, and the plurality of panels further comprises a third side panel foldably connected to the second side panel, the first side panel is in at least partial face-to-face contact with the third side panel and the back wall of the construct is at least partially formed by the third side panel overlapping at least a portion of the first side panel, the at least one end wall of the construct is at least partially formed by the second side panel, the second side panel comprising a first portion at least partially foldably connected to a second portion, the first portion of the second side panel is folded into at least partial face-to-face contact with the second portion of the second side panel.

23. The package of claim 22, wherein the cut is a curved cut.

24. The package of claim 23, wherein the cut extends from the respective panel of the plurality of panels at least partially into the respective end flap of the plurality of end flaps.

25. The package of claim 22, wherein the at least one end wall of the construct is a first end wall of the construct, the construct further comprises a second end wall, the plurality of panels further comprises a fourth side panel foldably connected to the first side panel, the fourth side panel comprising a first portion at least partially foldably connected to a second portion, the first portion of the fourth side panel folded into at least partial face-to-face contact with the second portion thereof to at least partially form the second end wall of the construct.

26. The package of claim 25, wherein the construct further comprises a front wall, the first side panel comprises a back portion at least partially separated from a front portion, the back portion in at least partial face-to-face contact with the fourth side panel to at least partially form the back wall of the construct, the front portion spaced away from the back portion to at least partially form the front wall of the construct.

27. The package of claim 22, wherein the respective end flap of the plurality of end flaps is a top end flap foldably connected to the first side panel, the plurality of end flaps further comprises a bottom end flap foldably connected to the first side panel, the at least one article engagement tab is a first at least one article engagement tab extending from the top end flap and positioned in the recessed portion of the at least one article, and the article engagement features further comprise a second at least one article engagement tab extending from the bottom end flap and positioned in another recessed portion of the at least one article.

28. The package of claim 27, wherein the bottom end flap is foldably connected to the first side panel at a fold line, the second at least one article engagement tab at least partially defined by a curved cut interrupting the fold line foldably connecting the bottom end flap to the first side panel.

* * * * *